United States Patent [19]

Pawlowski et al.

[11] Patent Number: 5,108,502
[45] Date of Patent: Apr. 28, 1992

[54] BORONIC ACID DYES

[75] Inventors: Norman E. Pawlowski, Corvallis, Oreg.; Dale D. Russell, Boise, Id.; Karla M. Robotti, Foster City, Calif.

[73] Assignee: Hewlett-Packard Company, Palo Alto, Calif.

[21] Appl. No.: 751,457

[22] Filed: Aug. 28, 1991

Related U.S. Application Data

[63] Continuation-in-part of Ser. No. 495,051, Mar. 16, 1990, abandoned.

[51] Int. Cl.$^5$ .................. C09D 11/02; C09B 46/00; C07F 5/02
[52] U.S. Cl. .................................. 106/22; 8/662; 534/726; 568/1; 568/6
[58] Field of Search .............. 106/22; 8/662; 534/726; 568/1, 6

[56] References Cited

U.S. PATENT DOCUMENTS

| | | | |
|---|---|---|---|
| 3,726,854 | 4/1973 | Lewis | 534/726 |
| 3,853,913 | 12/1974 | Brack et al. | 106/22 |
| 4,185,151 | 1/1980 | Kühlthau | 8/654 |
| 4,306,875 | 12/1981 | DeFeo et al. | 106/22 |
| 4,382,801 | 5/1983 | Loew | 8/655 |

FOREIGN PATENT DOCUMENTS

| | | | |
|---|---|---|---|
| 0133500 | 1/1979 | Fed. Rep. of Germany | 534/726 |
| 0116752 | 9/1981 | Japan . | |
| 0116754 | 9/1981 | Japan | 534/726 |

OTHER PUBLICATIONS

"Journal of Organometallic Chemistry", vol. 259, 1983 George Kabalka et al., pp. 269-274.
English translation of JP56/0116754.

Primary Examiner—William R. Dixon, Jr.
Assistant Examiner—Helene Klemanski

[57] ABSTRACT

Boronic dyes corresponding to the formula

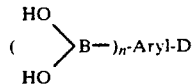

wherein D is an organic dye moiety, and n is 1 or 2 are described. Inks which are formulated for ink-jet printing and contain such a dye provide excellent images when printed on paper.

20 Claims, No Drawings 5,108,502

BORONIC ACID DYES

CROSS-REFERENCE TO RELATED APPLICATION

The present application is a continuation-in-part application of Ser. No. 07/495,051 now abandoned, filed Mar. 16, 1990.

TECHNICAL FIELD

This invention is in the field of water soluble dyes, such as azo dyes; the new dyes contain one or more boronic acid groups on an aryl ring. The invention is also concerned with the use of these dyes in inks for ink-jet printers.

BACKGROUND ART

The use of ink-jet printers and the formulation of special inks for printing on paper or similar materials have been the subject of intensive investigation for several years. Dyes have frequently provided the coloring components in such inks. Since these inks usually are waterbased, water-soluble dyes have been used; these dyes are azo, anthraquinone, methine, xanthine, oxazine, thiazine, etc. The water solubility has been provided by sulfonic acid groups or their salts attached to one or more aryl components of the dyes. Sulfonic acid groups, however, have near-zero resonance and near-zero inductive interaction when bound to aromatic rings; also, they cause a slight loss of color intensity due to steric interactions with an azo group when located adjacent the azo group. Furthermore, the sulfonate group contributes to solubility but not to waterfastness. For these reasons, the search for other dyes which can be used in ink-jet printers has continued.

DISCLOSURE OF INVENTION

We have discovered a new class of dyes, including azo dyes, that are of special utility in inks for ink-jet printing. These novel dyes contain at least one boronic acid moiety on an aryl ring; they are represented by the formula:

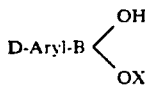

wherein D is an organic dye moiety, and X is H or, in a basic solution, a cation, such as Na, K, Li, or $NH_y(CH_3)_z$ wherein y and z each range from 0 to 4 and wherein y plus z is equal to 4. The boronic acid group provides the dye with water solubility and is a reactive group for binding it to substrates.

BEST MODES FOR CARRYING OUT THE INVENTION

The present invention includes a wide range of dyes, such as azo, triphenyl methane, anthraquinone, methine, xanthene, azine, oxazine, thiazine, thiazole, quinolinone, aminoketone, nitro, nitroso, phthalocyanine, acridine, indamine, and indophenol. It will now be described with reference to azo dyes as representative.

Novel monoazo compounds of this invention can be prepared in accordance with the following general equations:

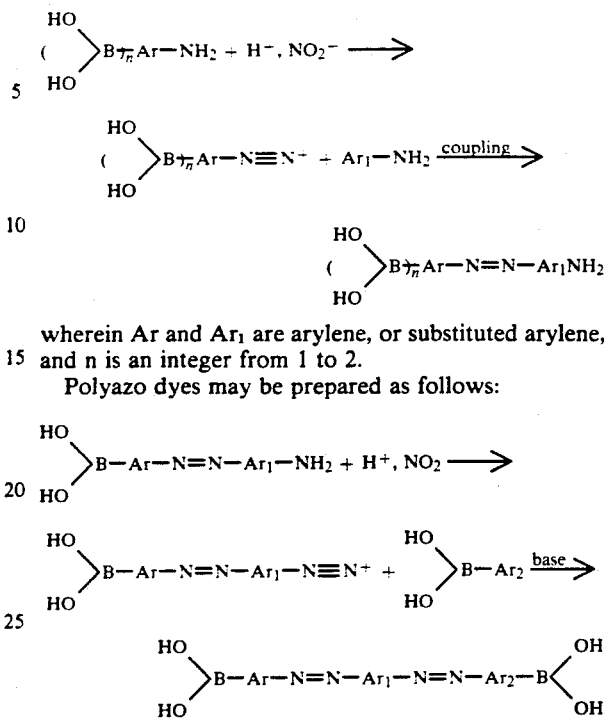

wherein Ar and $Ar_1$ are arylene, or substituted arylene, and n is an integer from 1 to 2.

Polyazo dyes may be prepared as follows:

$$\underset{HO}{\overset{HO}{>}}B-Ar-N=N-Ar_1-NH_2 + H^+, NO_2 \longrightarrow$$

$$\underset{HO}{\overset{HO}{>}}B-Ar-N=N-Ar_1-N\equiv N^+ + \underset{HO}{\overset{HO}{>}}B-Ar_2 \xrightarrow{base}$$

$$\underset{HO}{\overset{HO}{>}}B-Ar-N=N-Ar_1-N=N-Ar_2-B\underset{OH}{\overset{OH}{<}}$$

An electron donating group of $Ar_2$ facilitates the coupling reaction. Additional azo components may be added as long as $Ar_2$ has a diazotizable $NH_2$ substituent.

The polyazo dyestuffs correspond to the following structure:

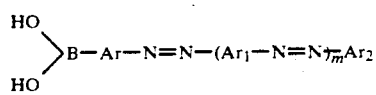

wherein m is an integer from 1 to about 4.

The coupling reaction produces a mixture of the ortho and para isomers in phenylene systems. In naphthylene systems, a mixture of $\alpha$ and $\beta$ isomers are obtained. The ratio of the $\alpha$ and $\beta$ isomers can be adjusted by control of pH.

There are several published methods for making aromatic boronic acid compounds that may be used as starting materials for making the dyes of this invention. The methods are not complex For instance, arylboronic acids are readily synthesized from several different types of organo-metallic compounds, including aryllithium compounds and Grignard reagents. For the latter, see George W. Kabalka et al, *J. Organomet. Chem.*, 1983, Vol. 259, #3, pages 269-274.

The dyes of this invention may have multiple boronic acid groups. Boronic acid groups at both ends of the molecule are particularly useful.

Boronic acid compounds are generally thought to be hydrolytically unstable in aliphatic compounds, but when they are attached directly to aryl rings, they have sufficient stability for use in ink-jet dyes. The compounds also have excellent water solubility and color, and the inks formulated with them make good prints on paper.

The dyes of the invention are preferably represented by the formula

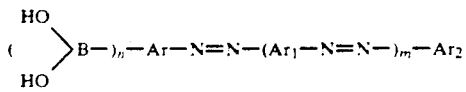

wherein Ar is a phenylene or substituted phenylene, Ar₁ is an arylene or substituted arylene selected from the group consisting of hydroxyphenylene, aminophenylene, N,N-di(lower alkyl)-aminophenylene, bromophenylene, chlorophenylene, lower alkylphenylene, nitrophenylene, naphthalene, hydroxynaphthylene, chloronaphthylene, bromonaphthylene, nitronaphthylene, aminonaphthylene, N,N-di-(lower alkyl)-aminonaphthylene, methoxyphenylene, and lower alkyl naphthylene, Ar₂ is an aryl or substituted aryl selected from the group consisting of hydroxyphenyl, aminophenyl, hydroxyaminophenyl, N,N-di(lower alkyl)-aminophenyl, N,N-di(lower alkyl)-aminocarboxyphenyl, bromophenyl, chlorophenyl, lower alkylphenyl, nitrophenyl, hydroxynitrophenyl, hydroxycarboxylphenyl, carboxylacrylamidophenyl, succinimidophenyl, tetrahydrocarboxylmethylphthalimidophenyl, naphthyl, hydroxynaphthyl, chloronaphthyl, bromonaphthyl, nitronaphthyl, hydroxynitronaphthyl, aminonaphthyl, N,N-di(lower alkyl-)aminonaphthyl, lower alkyl naphthyl, hydroxyaminona-phthyl, dihydroxyaminonaphthyl, hydroxydiaminona-phthyl, hydroxycarboxylnaphthyl, hydroxyaminoquinolyl, and aminomethoxydibenzofuranyl, m is 0 or an integer from 1 to about 4, and n is an integer from 1 to 2. Substitutions on the naphthyl ring may comprise one or both of the α and β positions. Desirably, Ar₁ and Ar₂ are free of sulfonate groups.

The dyes of the present invention are excellent for ink-jet printing for the following reasons:

(1) Due to the low acidity, thus low $pK_a$, of the boronic acid group, they undergo protonation to undissociated acid at neutral pH, causing a decrease in solubility due to natural neutralization when printed on paper.

(2) Boronic acid groups form strong, permanent bonds with cis-diols, such as occurs in sugars, starches, and cellulose. Thus, these dyes form strong permanent bonds to paper since paper contains starch and cellulose. Also, they may be used to dye cellulosic fibers, such as cotton.

(3) An arylboronic acid group, in the presence of alcohols, will form esters which render the boronic acid group less soluble. The possibility now exists for formulating reactions in which, on loss of water as when an ink starts to dry immediately after printing on paper, the boronic acid group condenses with alcohol groups to form polymeric ester bonds with (a) polyol groups bound to the other end of the dye molecule, or (b) a polyol added to the ink solution. One or more boronic acid dyes then bind to the polyol to form a dye-polyol polymer of reduced solubility on the paper. When these dyes are applied to paper through an ink-jet printer, they become quite waterfast. These types of reactions occur spontaneously between arylboronic acids and cis-diols, such as cis-1,2 and cis-1,3-diols, to the extent that the reaction product forms immediately in solution.

One method by which this invention operates is to use diols, or mixtures of alcohols, where the arylboronic acid functionality is unfavorable to ester formation as in dilute solutions such as ink, but do form insolubilizing ester bonds in highly concentrated solutions as occur upon evaporation of ink on paper. Slightly basic inks undergoing natural neutralization on paper may be further driving forces for this condensation, or polymerization, reaction. The reaction, in theory, may be reversible, but during the short times involved in events such as smearing of print, or rain drops on print, times and concentrations involved are insufficient to reverse the reaction. Thus, the print on paper appears smear resistant and waterfast.

Normally, cis-diols form a highly sterically favorable 5-member ring with arylboronic acid groups. The method of this invention is to involve the arylboronic acid group in a less favorable 6- or 7-member diol ester ring by using 1,3-diols, or possibly, even in an open chain ester. The thermodynamically less favorable large ring esters have unfavorable equilibrium in dilute solutions, but do form as the ink dries and becomes concentrated. Natural neutralization and the heat of a possible printer dryer are additional driving forces for the condensation or polymerization.

(4) A major, significant advantage to arylboronic acid groups as dye solubilizing groups is the ability of the boron atom to interact with the chromophore. Boron contains an empty p-orbital of proper size and shape for maximum interaction with the aryl ring of dye molecules. The boronic acid group may act as an electron withdrawing group, stabilizing charge-transfer excited states, and stabilizing the resonance contribution of electron donating groups in other parts of the chromophore, all of which contribute to bathochromic shifts within dye molecules.

For example, simple arylmonoazo compounds by themselves are lightly colored; the presence of electron donor and acceptor groups provide strong hyperchromic and bathochromic shifts to arylazo compounds. Boronic acid groups are strong acceptor groups, and thus a very significant advantage to these groups in arylazo dyes is their contribution to increased color strength or intensity (blackness also), and their ability to shift wavelengths of simple azo compounds to longer wavelength absorptions.

The significance of this advantage may be further understood when one realizes that arylsulfonate groups have near-zero resonance and near-zero inductive interaction when bound directly to aromatic rings. In addition, due to their large size, arylsulfonate groups, when adjacent in the same ring to azo groups, cause a slight loss of dye intensity due to steric interactions with the azo group. Thus, arylboronic acid dyes offer a significant advantage over the current selection of sulfonated dyes, particularly the sulfonated azo dyes.

The boronic acid dyes of the present invention can, in general, be used in ink formulation for ink-jet printers in place of the sulfonate azo dyestuffs currently in use.

Preferred ink formulations comprise, by weight:
(a) from about 0.05% to 10% dye;
(b) sufficient pH adjuster to maintain the formulation at a pH from about 6 to about 9; and
(c) the balance water.

The ink formulations will generally include up to about 20% of an organic solvent for the dyestuff. Typical solvents are glycols, pyrrolidones, formamide, 2-(2-butoxyethoxy)ethanol (n-butyl carbitol), 1,5-pentanediol, 1,4-butanediol, as well as the butoxy, ethoxy, and methoxy half-ethers of glycols and diglycols.

Buffers, such as borates, ammonium salts, acetates, phosphates, or tris[hydroxymethyl]aminomethane may be used to control the pH of the inks.

Additives which are commonly found in thermal jet inks may be added to the present inks These additives include biocides, humectants, surfactants, etc.

When a polyol or a polyamine is mixed with an equal molar volume of dye, the hydroxyl or amine groups will react with the boronic acid group of the dye. If the dye has two or more boronic acid groups, polymeric products can be formed.

When the ink formulations of the present invention are used with a Hewlett-Packard DeskJet ink-jet printer to print on paper, images that are sharp and permanent are obtained.

Polyamines added to boronic acid dyes are a formulation complex, where boronic acid dyes are unique in forming complexes with amines. The first set of boronic acid dyes were excessively soluble in dilute solution, but adding polyamines gave them considerable improvement in waterfastness. The complex is probably simple salt formation.

Moreover, adding polyamines may be a simple method of giving boronic acid dyes more solubility when one wants to avoid adding a sulfonate group and the addition of multiple boronic acid groups may be too expensive.

INDUSTRIAL APPLICABILITY

The novel boronic acid dyes and inks containing the dyes are expected to find use in ink-jet printers.

EXAMPLES

The following Examples are used to illustrate the present invention.

EXAMPLE 1

0.1 mole 3-aminophenylboronic acid was diazotized with acid and 1.05 mole sodium nitrite to form the diazonium intermediate. This compound was then coupled with 14 g phenol at pH 8.5, and the resultant product was a mixture that corresponded to the following formula:

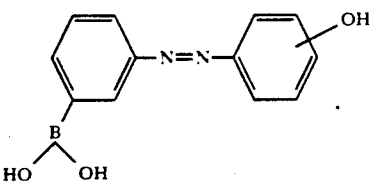

wherein the hydroxyl radical is ortho or para to the azo linkage. The major products produced can be separated by high performance liquid chromatography, preparative scale.

EXAMPLE 2

The diazonium intermediate of Example 1 was coupled with N,N-dimethylaniline to form

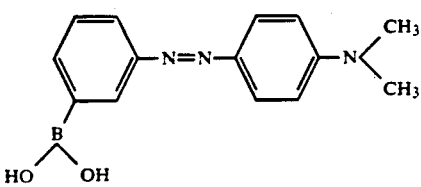

The procedure of Example 1 was followed

EXAMPLE 3

The diazonium intermediate of Example 1 was coupled with 2-naphthol to form

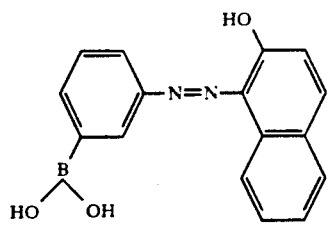

The procedure of Example 1 was employed. The para isomer was the major product and the ortho isomer was the minor product.

EXAMPLE 4

The diazonium interdiate of Example 1 was coupled with 3-hydroxyaniline to form

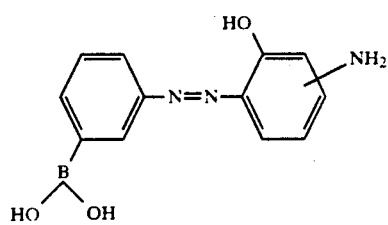

The procedure of Example 1 was followed.

EXAMPLE 5

The diazonium salt of 3-aminophenylboronic acid was coupled with 1-aminonaphthalene. The product of this reaction was diazotized and then coupled with 3-aminophenylboronic acid and the resultant dye corresponded to the formula

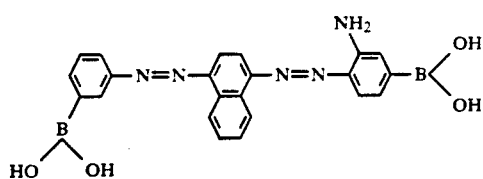

EXAMPLE 6

Additional dyes can be made using standard diazotization procedures but in which $R_1$ is naphthyl and $R_2$ is hydroxy naphthyl. The hydroxy group can be either alpha or beta, and so long as coupling occurs adjacent to the hydroxy group, the result will be a good red dye.

EXAMPLE 7

In order to compare the waterfastness of borated dyes with sulfonated dyes the following experiment was perfomed. Two dyes having the following structure except that in one X is a boronic acid group and in the other it is sulfonic acid

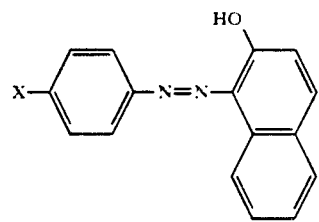

were made into inks according to the following formulae:

A. 0.05% dye
5.5% diethylene glycol (DEG)
balance water
B. 2% dye
12% 2-pyrrolidone (2-P)
balance water.

These inks were used to fill printer pens and generate print samples, using a conventional ink-jet printer. The waterfastness was determined as follows:

Checkerboard patterns of one inch squares were printed by alternating a 100% full area with a blank area to obtain a specimen that had a top row of blank-full-blank squares, a second row of full-blank-full squares, and a bottom row of blank-full-blank squares. One pattern was set aside as a standard. Another pattern was subjected to a washing in deionized water for five minutes with vigorous stirring. After the washed pattern was dried, L*, a*, b* coordinates were measured for the standard and the washed squares, averaging at least four squares. ΔE was computed as the difference in color between the standard and the washed sample.

All color measurements were made according to ASTM Method D2244-85, using 10° observer, D65 illuminant, with following result:

| Solvent | Dye | Initial | | | Washed | | | ΔE |
|---|---|---|---|---|---|---|---|---|
| | | L* | a* | b* | L* | a* | b* | |
| DEG | Boronic | 87.8 | 13.0 | 12.2 | 88.7 | 10.9 | 10.6 | 2.8 |
| | Sulfonate | 89.3 | 11.1 | 11.7 | 93.9 | 1.8 | 2.2 | 14.0 |
| 2-P | Boronic | 75.4 | 35.9 | 40.6 | 76.1 | 34.1 | 36.6 | 4.4 |
| | Sulfonate | 72.4 | 33.6 | 49.4 | 84.7 | 11.1 | 14.7 | 43.2 |

Table of Color Measurements for Waterfastness Test

The ΔE for the borated dye is an order of magnitude better than those for the sulfonated dye in the 2-P system. ΔE is a factor of 5 better in the DEG system.

EXAMPLES 8-26

The following boronic acid dyes were prepared, with $m=0$ and $n=1$:

| Example/Name | R | R₂ |
|---|---|---|
| 8 | 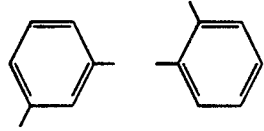 | |

3-((2-hydroxyphenyl)azo)benzene boronic acid

| Example/Name | R | R₂ |
|---|---|---|
| 9 | 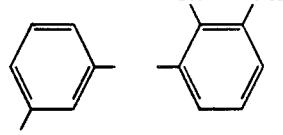 | |

3-((2-hydroxy-3-aminophenyl)azo)benzene boronic acid

| 10 | 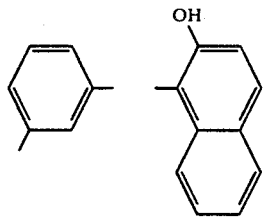 | |

3-((2-hydroxy-1-naphthyl)azo)benzene boronic acid

| 11 | 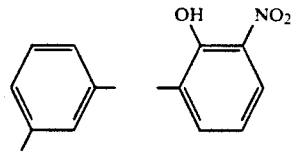 | |

3-((2-hydroxy-3-nitrophenyl)azo)benzene boronic acid

| 12 | 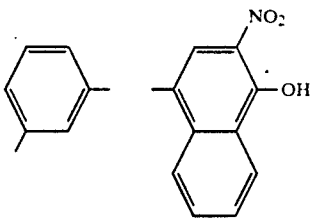 | |

3-((4-hydroxy-3-nitro-1-naphthyl)azo)benzene boronic acid

| 13 | 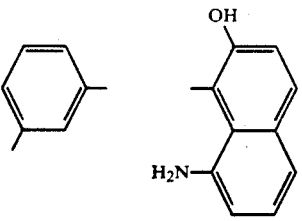 | |

3-((2-hydroxy-8-amino-1-naphthyl)azo)benzene boronic acid

| 14 | 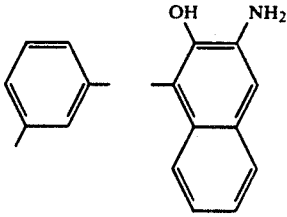 | |

3-((2-hydroxy-3-amino-1-naphthyl)azo)benzene boronic acid

| Example/Name | R | R₂ |
|---|---|---|
| 15 | 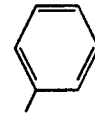 | 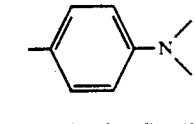<br>3-((8-hydroxy-5-amino-7-quinolyl)azo)benzene boronic acid |
| 16 | | 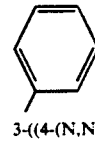<br>3-((2-amino-3-methoxyl-1-dibenzofuranyl)azo)benzene boronic acid |
| 17 | | 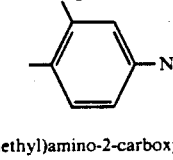<br>3-((4-hydroxy-3-carboxylphenyl)azo)benzene boronic acid |
| 18 | | 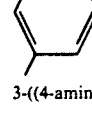<br>3-((4-hydroxy-3-carboxyl-1-naphthyl)azo)benzene boronic acid |
| 19 | | 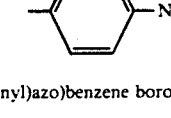<br>3-((2-hydroxy-3-carboxyl-1-naphthyl)azo)benzene boronic acid |
| 20 | | 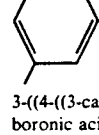<br>3-((3-hydroxy-4-carboxyl-2-naphthyl)azo)benzene boronic acid |
| 21 | | 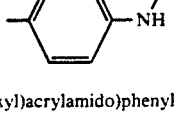<br>3-((4-(N,N-dimethyl)aminophenyl)azo)benzene boronic acid |
| 22 | | 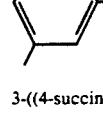<br>3-((4-(N,N-dimethyl)amino-2-carboxyphenyl)azo) benzene boronic acid |
| 23 | | 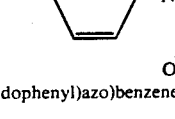<br>3-((4-aminophenyl)azo)benzene boronic acid |
| 24 | | 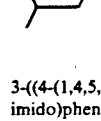<br>3-((4-((3-carboxyl)acrylamido)phenyl)azo)benzene boronic acid |
| 25 | | 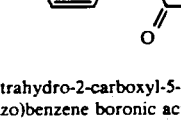<br>3-((4-succinimidophenyl)azo)benzene boronic acid |
| 26 | | 3-((4-(1,4,5,6-tetrahydro-2-carboxyl-5-methylphthal-imido)phenyl)azo)benzene boronic acid |

Inks made from the dyes of Examples 1–6 and 8–26 are expected to evidence the same type of behavior observed for the inks discussed in Example 7.

Thus, there has been disclosed a water soluble organic dye in which there is at least one boronic acid group on an aryl radical. It will be apparent to one of ordinary skill in this art that various changes and modifications of an obvious nature may be made without departing from the spirit of the invention, and all such changes and modifications are considered to fall within the scope of the invention, as defined by the appended claims.

What is claimed is:

1. An azo dye of the formula

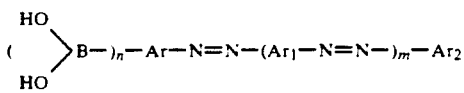

wherein Ar is a phenylene or substituted phenylene, Ar₁ is an arylene or substituted arylene free of sulfonate groups, Ar₂ is an aryl or substituted aryl free of sulfonate groups, m is 0 or an integer from 1 to about 4, and n is an integer from 1 to 2.

2. The azo dye of claim 1 wherein Ar₁ is an arylene or substituted arylene selected from the group consisting of hydroxyphenylene, aminophenylene, N,N-di(lower alkyl)-aminophenylene, bromophenylene, chlorophenylene, lower alkylphenylene, nitrophenylene, naphthalene, hydroxynaphthylene, chloronaphthylene, bromonaphthylene, nitronaphthylene, aminonaphthylene, N,N-di-(lower alkyl)aminonaphthylene, methoxyphenylene, and lower alkyl naphthylene, Ar₂ is an aryl or substituted aryl selected from the group consisting of hydroxyphenyl, aminophenyl, hydroxyaminophenyl, N,N-di(lower alkyl)-aminophenyl, N,N-di(lower alkyl)-aminocarboxyphenyl, bromophenyl, chlorophenyl, lower alkylphenyl, nitrophenyl, hydroxynitrophenyl, hydroxycarboxylphenyl, carboxylacrylamidophenyl, succinimidophenyl, tetrahydrocarboxylmethylphthalimidophenyl, naphthyl, hydroxynaphthyl, chloronaphthyl, bromonaphthyl, nitronaphthyl, hydroxynitronaphthyl, aminonaphthyl, N,N-di(lower alkyl)aminonaphthyl, lower alkyl naphthyl, hydroxyaminonaphthyl, dihydroxyaminonaphthyl, hydroxydiaminonaphthyl, hydroxycarboxylnaphthyl, hydroxyaminoquinolyl, and aminomethoxydibenzofuranyl.

3. The dye of claim 1 wherein n is 1.
4. The dye of claim 1 wherein m is 0.
5. The dye of claim 1 wherein m is 1.
6. The dye of claim 1 wherein m is 2.
7. The dye of claim 1 wherein Ar₂ is substituted by

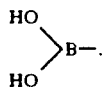

8. The dye of claim 1 wherein Ar is phenylene, Ar₂ is hydroxyphenyl, m is 0 and n is 1.
9. The dye of claim 1 wherein Ar is phenylene, Ar₂ is 4-(N,N-dimethyl)aminophenyl, m is 0, and n is 1.
10. The dye of claim 1 wherein Ar is phenylene, Ar₂ is 2-hydroxynaphthyl, m is 0, and n is 1.
11. The dye of claim 1 wherein Ar is phenylene, Ar₂ is aminohydroxyphenyl, m is 0 and n is 1.
12. The dye of claim 1 wherein Ar is phenylene, Ar₁ is naphthylene, Ar₂ is 2-aminophenyl-4-boronic acid, m is 1 and n is 1.
13. An ink-jet ink for use in an ink-jet printer comprising:

(a) from about 0.05% to about 10% of a water soluble organic dye which has at least one boronic acid group on an aryl radical,
(b) a pH adjuster to maintain the formulation at a pH from about 6 to about 9, and
(c) the balance water.

14. The ink of claim 13 wherein the dye is azo, triphenyl, anthraquinone, methine, xanthene, azine, oxazine, thiazine, thiazole, quinolinone, aminoketone, nitro, nitroso, phthalocyanine, acridine, indamine and indophenol.

15. The ink of claim 14 wherein
(a) the dye corresponds to the formula:

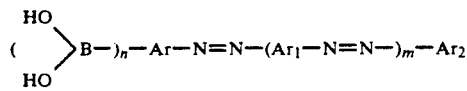

wherein Ar and Ar₁ are each arylene or substituted arylene, Ar₂ is aryl or substituted aryl, m is 0 or an integer from 1 to about 4, and n is 1 or 2;
(b) pH adjuster to maintain the resultant formulation at a pH from about 6 to about 9; and
(c) the balance water.

16. The ink of claim 15 wherein n is 1.
17. The ink of claim 15 wherein m is 1.
18. The ink of claim 15 wherein m is 2.
19. The ink of claim 15 wherein Ar₁ is an arylene or substituted arylene selected from the group consisting of hydroxyphenylene, aminophenylene, N,N-di(lower alkyl)-aminophenylene, bromophenylene, chlorophenylene, lower alkylphenylene, nitrophenylene, naphthalene, hydroxynaphthylene, chloronaphthylene, bromonaphthylene, nitronaphthylene, aminonaphthylene, N,N-di-(lower alkyl)aminonaphthylene, methoxyphenylene, and lower alkyl naphthylene, Ar₂ is an aryl or substituted aryl selected from the group consisting of hydroxyphenyl, aminophenyl, hydroxyaminophenyl, N,N-di(lower alkyl)-aminophenyl, N,N-di(lower alkyl)-aminocarboxyphenyl, bromophenyl, chlorophenyl, lower alkylphenyl, nitrophenyl, hydroxynitrophenyl, hydroxycarboxylphenyl, carboxylacrylamidophenyl, succinimidophenyl, tetrahydrocarboxylmethylphthalimidophenyl, naphthyl, hydroxynaphthyl, chloronaphthyl, bromonaphthyl, nitronaphthyl, hydroxynitronaphthyl, aminonaphthyl, N,N-di(lower alkyl)aminonaphthyl, lower alkyl naphthyl, hydroxyaminonaphthyl, dihydroxyaminonaphthyl, hydroxydiaminonaphthyl, hydroxycarboxylnaphthyl, hydroxyaminoquinolyl, and aminomethoxydibenzofuranyl.

20. The ink of claim 19 wherein Ar₂ is substituted by

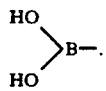

* * * * *